United States Patent
Inayama

(10) Patent No.: US 6,843,620 B2
(45) Date of Patent: Jan. 18, 2005

(54) CUTTING TOOL AND INDEXIABLE INSERT THEREFOR

(75) Inventor: Takashi Inayama, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/022,365

(22) Filed: Dec. 20, 2001

(65) Prior Publication Data

US 2002/0122700 A1 Sep. 5, 2002

(30) Foreign Application Priority Data

Dec. 28, 2000 (JP) .......................... 2000-401318

(51) Int. Cl.$^7$ .......................... B23P 15/28; B26D 1/00; B26D 3/00
(52) U.S. Cl. .......................... 407/114; 407/117; 407/100
(58) Field of Search .......................... 407/100, 110, 407/113, 114, 115, 116, 117

(56) References Cited

U.S. PATENT DOCUMENTS

| | | | | |
|---|---|---|---|---|
| 3,754,309 A | * | 8/1973 | Jones et al. | 407/77 |
| 3,815,191 A | | 6/1974 | Holma | |
| 4,629,372 A | * | 12/1986 | Huston | 407/116 |
| 4,776,733 A | | 10/1988 | Pettersson | |
| 5,085,541 A | * | 2/1992 | Simpson, III | 407/110 |
| 5,137,396 A | * | 8/1992 | Durschinger | 407/117 |
| 5,439,327 A | * | 8/1995 | Wertheim | 407/11 |
| 5,876,154 A | * | 3/1999 | Enderle | 407/114 |
| 6,186,705 B1 | * | 2/2001 | Kumar et al. | 407/114 |
| 2001/0014259 A1 | * | 8/2001 | Inayama | 407/116 |

FOREIGN PATENT DOCUMENTS

| | | |
|---|---|---|
| EP | 0 775 544 A1 | 5/1997 |
| EP | 0 958 873 A1 | 11/1999 |
| EP | 1 038 616 A1 | 9/2000 |
| EP | 1123765 A1 | 8/2001 |

OTHER PUBLICATIONS

Austrian Patent Office Communication dated Apr. 4, 2003.
European Patent Office Communication dated Apr. 10, 2003.

* cited by examiner

Primary Examiner—Daniel Howell
Assistant Examiner—Brian D. Walsh
(74) Attorney, Agent, or Firm—Sughrue Mion, PLLC

(57) ABSTRACT

A cutting tool is provided which comprises an end cutting edge at an end of a rake face, and a depression formed in the rake face so as to provide the end cutting edge with a concave edge portion.

2 Claims, 7 Drawing Sheets

CUTTING TOOL AND INDEXIABLE INSERT THEREFOR

BACKGROUND OF THE INVENTION

The present invention relates to a cutting tool for cutting off and grooving by turning and an indexable insert (throwaway tip) for such a cutting tool.

Shown in FIG. 13 is a related indexable insert 101 for a bit or cutting tool used for cutting off or grooving by turning. The insert 101 has a pair of projections (beveled walls) 120, 120 on a rake face 116. The projections 120, 120 are disposed adjacent an end cutting edge 115 and the opposite ends of the rake face 116. With such an insert 101, a chip K is forcedly pressed against the projections 120, 120 and deformed into a convexly or V-like bent cross section before being removed from the place where cutting is performed.

The chip K deformed as above by such an insert 101 is higher in rigidity as compared with a chip of a flat cross section and can be easily divided into sections of suitable lengths even if it is removed so as to have a spiral shape. Thus, the chip does not coil around the cutting tool, work or chuck and therefore the insert 101 is advantageous in the disposal of chip.

SUMMARY OF THE INVENTION

In cutting off of a work in the form of bar by using the related insert 101, the chip K is forcedly pressed against the projections 120, 120 adjacent the opposite ends of the cutting edge 115 and thereby deformed in cross section. By the projections 120, 120, a large cutting resistance is caused and applied to the insert 101 as compared with an insert that is not provided with such projections, thus causing the cutting edge to wear in a shorter period and therefore the life of the insert to become shorter.

In addition, such a large cutting resistance causes the following problem in cutting off. As shown in FIG. 13, immediately before the work is cut off by the insert 101 whose end cutting edge 115 has a lead angle, the cut-off width portion V is shaped so as to taper toward the end face T of a portion of the work to be cut off (i.e., right-hand portion in FIG. 13). The cutting off is completed when the end cutting edge 115 is fed longitudinally further. Namely, as the end cutting edge 115 is fed longitudinally further, the cut-off width portion V becomes smaller in diameter gradually and finally the portion (right-hand portion in FIG. 13) of the work is cut off. In this instance, at the last stage of cutting off, the portion of the work is not cut off but broken off by the lateral force resulting from the force for longitudinal feed, a little before the end cutting edge 115 reaches the center of the end face T of the work. Accordingly, at the end face of the cut-off portion (right-hand portion in FIG. 13) of the work, there remain burrs in the form of a boss (hereinafter will be also referred to as center boss) protruding outward.

In cutting off by the related insert, the center boss tends to become larger due to a large cutting resistance adjacent the cut-off surface (end face) of the work. Accordingly, in cutting off of a precision shaft or the like part that requires a highly accurate machining of the end face thereof, it is inevitably necessitated to remove the center boss at a later process (i.e., by secondary machining). In the meantime, at the end face of the remaining portion of the work that is clamped in the chuck (the left-hand portion in FIG. 13), there is not formed a center boss since the cut-off width portion V is cut off by the end cutting edge which is fed longitudinally beyond the center of the end face of the remaining portion of the work.

Further, for the same reason, in cutting off of a work in the form of a pipe, there are formed at the inner circumferential periphery of an end face of a cut-off portion of the work, burrs (hereinafter will be also referred to as inner periphery burrs) protruded toward the center of the pipe. Accordingly, also in this instance, when the cut-off work is required to have a highly accurate machining of the end face, it is similarly and inevitably required to carry out an additional process for removing the burrs.

Furthermore, the related insert described above produces different chip deforming effects depending upon the feed speed since the projections for deformation of the chip are disposed a little apart from the end cutting edge. Furthermore, when the feed speed is small, there may occur such a case that an intended chip deforming effect cannot be obtained. For example, when the feed speed is small, i.e., 0.05 mm/rev, the chip is so thin and is not strongly pressed against the projections (i.e., does not strike hard against the projections). Thus, the resulting deformation of the chip is so small or the intended chip deforming effect cannot be obtained. Further, there may occur such a case in which although the chip strikes hard against the projections the temperature of chip is low so that the projections can serve only as chip breakers. Accordingly, the chip produced by the cutting off has a nearly flat cross section and is therefore low in the rigidity. Further, though the chip coils, it does coarsely or it tends to be long and continuous, thus tending to make it unstable the direction in which the chip is removed or tending to cause the chip to coil around the work.

On the other hand, when the feed speed is 0.1 mm/rev, it becomes possible to slightly deform the cross section of the chip but the deformation is not sufficient. Therefore, a problem similar to that described above is caused. Further, when the feed speed is large, i.e., 0.2 mm/rev or larger, the chip is so thick and is pressed against the projections more strongly and therefore a large chip deforming effect is obtained. Accordingly, stable disposal of the chip can be attained. However, the strong pressing of the chip against the insert results in a large cutting resistance, i.e., a large resistance applied to the end cutting edge, thus lowering the life of the insert due to an excessive heat generated by cutting. Namely, by the above-described related insert, the feed speed range that can attain a desired chip deforming effect is narrow and the life of the insert becomes shorter when the feed speed is set so that a stable disposal of chip can be obtained.

It is accordingly an object of the present invention to provide a cutting tool that is free from the above noted problems inherent in the related cutting tool.

It is another object of the present invention to provide a cutting tool of the foregoing character that is small in the cutting resistance but can attain an excellent chip deforming effect stably.

It is a further object of the present invention to provide an indexable insert for a cutting tool of the foregoing character.

To accomplish the above objects, there is provided according to an aspect of the present invention a cutting tool comprising an end cutting edge at an end of a rake face and a depression formed in the rake face so as to provide the end cutting edge with a concave edge portion.

According to a further aspect of the present invention, there is provided an indexable insert comprising an end cutting edge at an end of a rake face, the end cutting edge having a concave edge portion, and a spherical depression formed in the rake face so as to extend continuously from the concave edge portion of the end cutting edge.

According to a further aspect of the present invention, there is provided an indexable insert comprising an end cutting edge at an end of a rake face, and a spherical depression formed in the rake face so as to form a concave edge portion in the end cutting edge.

The term "spherical depression" is herein used to indicate a depression made up of a portion of a true sphere or a portion of a nearly spherical shape. The nearly spherical shape includes a spheroid and an egg-like shape. The concave edge portion includes a circular arc-shaped edge portion and a nearly circular arc-shaped edge portion.

In cutting off of a work in the form of bar by using the cutting tool of this invention, the chip is deformed after the shape of the concave edge portion of the end cutting edge, i.e., in such a manner as to have a cross section which is bent so as to protrude downward and then removed rearward after passing through the spherical depression formed in the rake face. Namely, the chip is drawn or bent widthwise so as to become higher in rigidity and is removed rearward, i.e., in the direction of going away from the end cutting edge or in the direction opposite to the direction of feed for longitudinal cutting off. Widthwise bending of the chip is thus obtained not by pressing the chip against the projections formed on the rake face at locations rearward of the end cutting edge as in the related insert but by the shape of the concave edge portion of the end cutting edge itself and the spherical depression formed in the rake face. Accordingly, the cutting resistance is small and deformation of the chip can be obtained irrespective of the longitudinal feed speed of the insert, thus making it possible to obtain a stable chip deforming effect.

Furthermore, since the insert does not have any projections for deformation of the chip and the cutting resistance is small, the center boss or the burrs otherwise caused at the separated end surface of the work at the time of cutting off can be made smaller. Further, decrease in the wear of the cutting edge results from the smaller cutting resistance, thus making it possible to obtain an elongated life of the insert in cutting off or grooving.

The concave edge portion is preferably disposed at the center of the end cutting edge for the reason that the direction in which the chip is removed rearward becomes stable. Further, the maximum depth $D_a$ of the concave edge portion is preferably within the range from 0.05 to 0.25 mm. When the maximum depth $D_a$ is smaller than 0.05 mm, a pronounced chip deforming effect cannot be obtained. When the maximum depth $D_a$ exceeds 0.25 mm, the resistance to deformation of the chip becomes large though a pronounced chip deforming effect is obtained and therefore the insert life becomes short. Further, $D_a$ is preferably within the range from 0.05 to 0.2 mm. By setting $D_a$ at 0.2 mm or smaller, the chip can be removed more stably.

In the cutting tool of this invention, it is preferable that $W/2 \leq W_a \leq 2W/3$ where W is the width of the end cutting edge and $W_a$ is the width of the concave edge portion of the end cutting edge. When $W_a$ is larger than W/2, a pronounced chip deforming effect cannot be obtained. When $W_a$ is larger than 2W/3, the strength of the end cutting edge is lowered at the opposite end portions thereof. Further, it is preferable that $D_a < D_b$ where $D_b$ is the maximum depth of the spherical depression. This is effective for decreasing the cutting resistance and suppressing formation of burrs. Further, it is preferable that $W_a < W_b$ where $W_b$ is the maximum width of the spherical depression. This is effective for decreasing the cutting resistance and suppressing formation of burrs.

DESCRIPTION OF THE PREFERRED EMBODIMENTS

Figure 1:
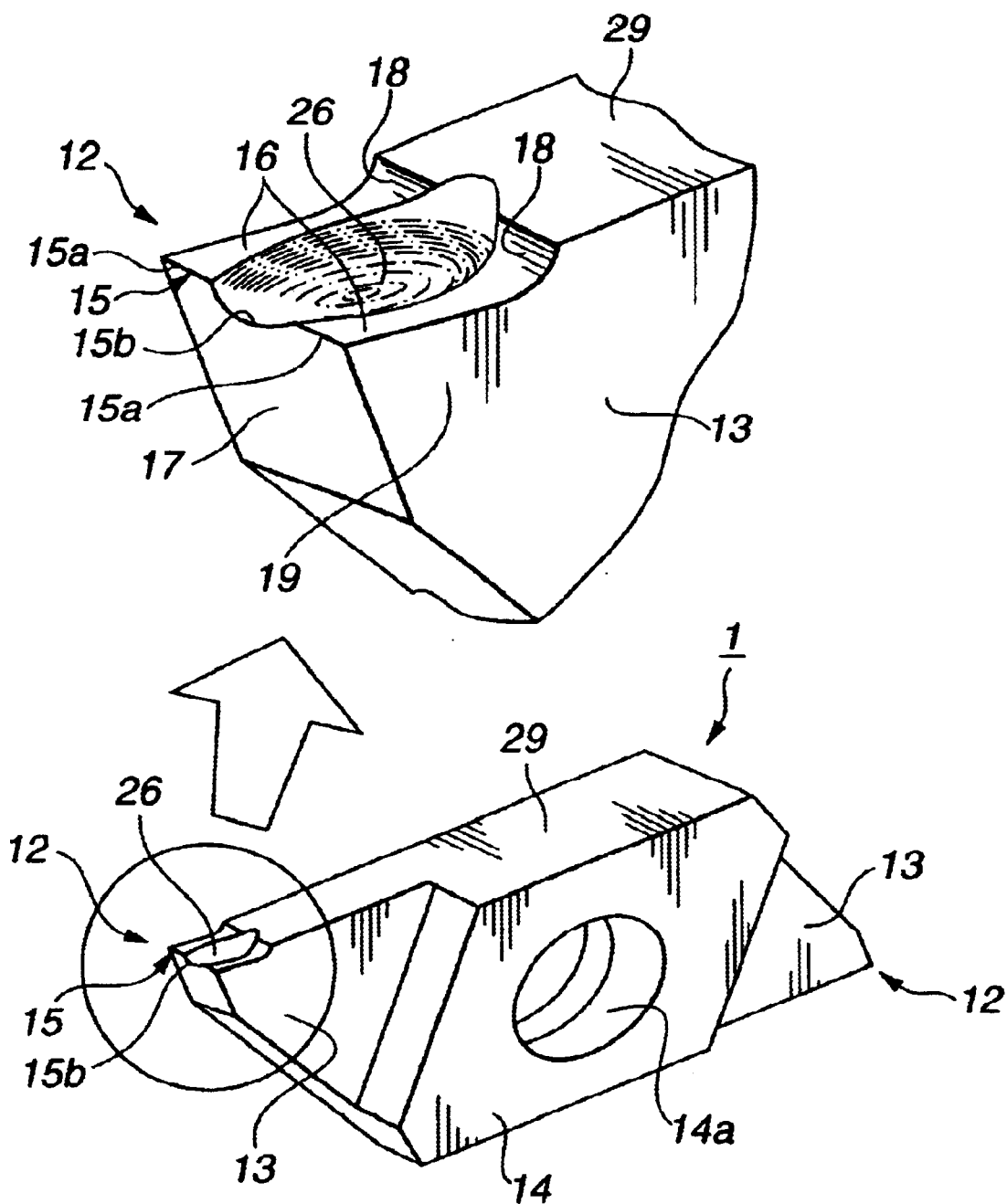
FIG. 1 is a perspective view of an indexable insert according to a first embodiment of the present invention and an enlarged view of an important portion thereof.
Figure 2:
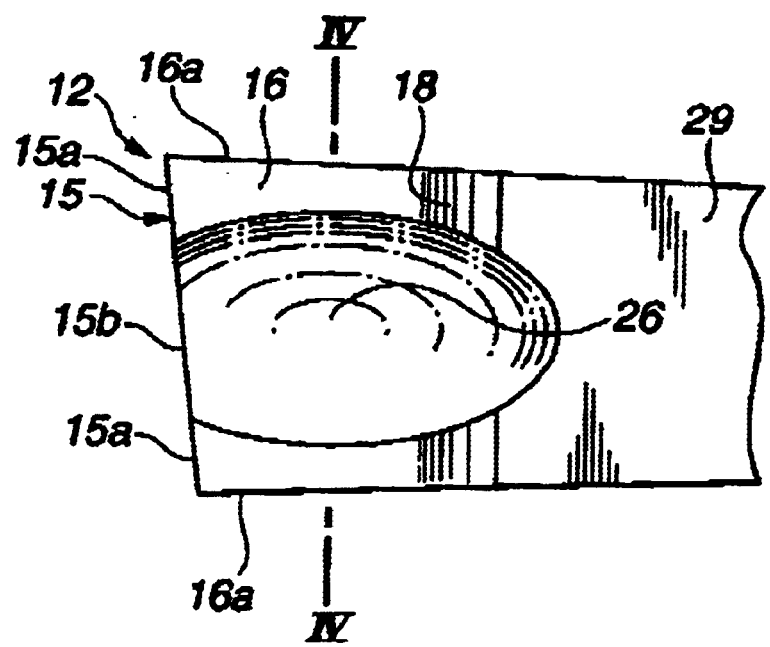
FIG. 2 is a plan view of the important portion of the indexable insert of FIG. 1 when observed from the rake face side.
Figure 3:
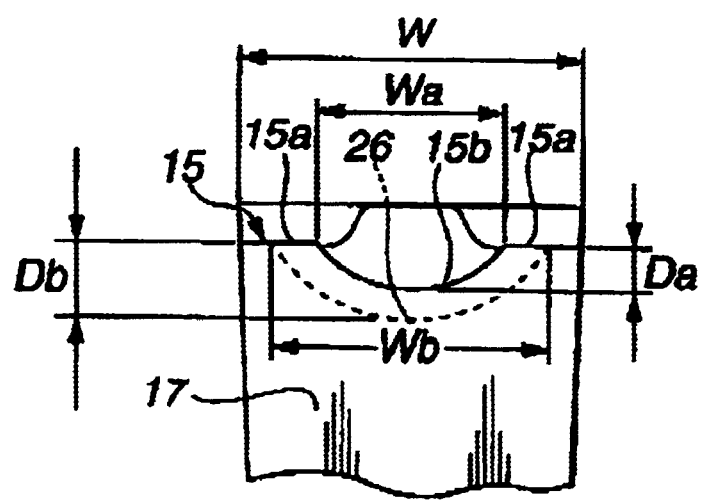
FIG. 3 is an enlarged side elevational view of the important portion of the indexable insert of FIG. 1 when observed from a front end flank side.
Figure 4:
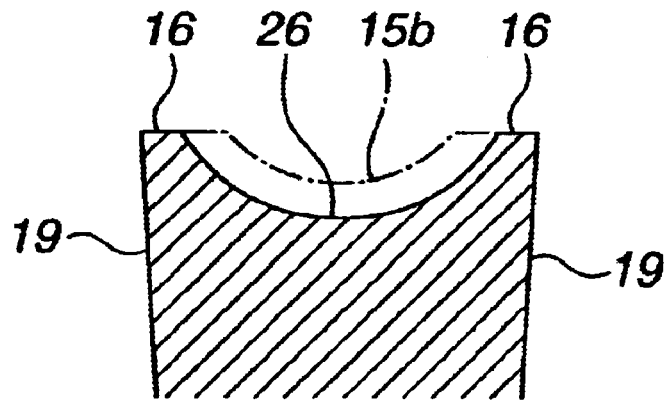
FIG. 4 is a sectional view taken along line IV—IV in FIG. 2.
Figure 5:
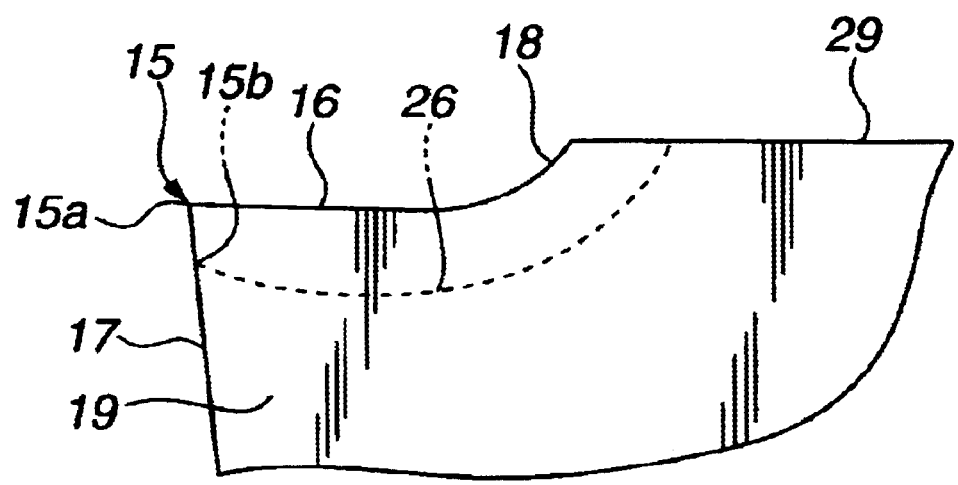
FIG. 5 is a side elevational view of the important portion of the indexable insert of FIG. 1 when observed from a side flank side.

Referring first to FIGS. 1 to 5, inclusive, an indexable insert according to a first embodiment of the present invention is generally designated by 1 and is made up of a sintered body of a super alloy, cermet or ceramic. The indexable insert 1 is in the form of a parallelogram block when observed in a side elevation thereof and of a two-corner type having a pair of sharp angled ends 12, 12 each of which has an end cutting edge 15. Thus, description is made with respect to a first corner. In this embodiment, triangular portions 13, 13 having the sharp angled ends 12, 12 are formed thinner, and a remaining thicker portion 14 has a central fixing hole 14a used for clamping the indexable insert 1 in a holder (not shown).

The end cutting edge 15 at the first corner is formed at a junction of a rake face 16 and a front end flank 17. The rake face 16, when observed from the above (i.e., when observed in plan), has a pair of opposite sides 16a, 16a extending straightly or linearly rearward from the opposite ends of the end cutting edge 15 so as to provide a back taper of 2 degrees, i.e., so as to taper rearward. The rake face 16 inclines downward and rearward from straight cutting edge portions 15a, 15a of the end cutting edge 15 so as to provide a positive rake angle of 6 degrees and has at the rear end thereof a breaker wall 18 made up of a curved surface.

Further, the front end flank 17 is provided with an end relief angle of 6 degrees, and a side flank 19 is provided with a side relief angle of 3 degrees. In the meantime, the end cutting edge 15 is provided with a lead angle θ of 5 degrees when observed in plan.

The rake face 16 is formed with a spherical depression 26. Specifically, the depression 26 is a spheroidal depression. By the spheroidal depression 26, the end cutting edge 15 is formed with a concave edge portion 15b located between the straight edge portions 15a, 15a. The spheroidal depression 26 has a curved peripheral surface which constitutes a portion of a spheroid whose major axis extends rearward from the concave edge portion 15b and is located at the widthwise center of the rake face 16. The spheroidal depression 26 has a rear end portion formed in the breaker wall 18 and a hold-down surface 29 for clamping of the indexable insert 1.

The width W of the end cutting edge 15 is, for example, about 1.8 mm and the width $W_a$ of the concave edge portion 15b formed thereat is about 0.9 mm. When observed in side elevation from the front end flank 17 side, the concave edge portion 15b is in the form of a circular arc of the radius R of about 1.5 mm. Further, the maximum width $W_b$ of the spheroidal depression 26 when measured in the direction parallel to the end cutting edge 15 is 1.2 mm and is thus set larger than the width $W_a$ of the concave edge portion 15b. By this, the cutting resistance can be reduced and the chip can be removed more stably. The maximum depth $D_a$ of the concave edge portion 15b is 0.15 mm. However, the maximum depth $D_b$ of the spheroidal depression 26 with respect to the rake face 16 is about 0.25 mm, and the spheroidal depression 26 becomes deeper as it extends rearward from the concave edge portion 15b. Further, by $D_a<D_b$, the cutting resistance can be reduced and formation of burrs can be suppressed more effectively. In the meantime, the concave edge portion 15b of the end cutting edge 15 and the spheroidal depression 26 can be formed all together at the same sintered body forming process of the indexable insert 1. Otherwise, an indexable insert not provided with such a concave edge portion 15b and a spheroidal depression 26 is first formed and sintered, and thereafter the concave edge portion 15b and the spheroidal depression 26 are formed by grinding by using a diamond grinder having an outer surface corresponding in shape to the concave edge portion 15b and the spheroidal depression 26.

The indexable insert 1 of this embodiment structured as above is used to cut off a work in the form of bar in the following manner. The indexable insert 1 is clamped in a holder to constitute a cutting tool. In cutting off, a chip is deformed after the shape of the end cutting edge 15 and has such a curved or circular arc-shaped cross section that protrudes downward. The chip is removed rearward from the end cutting edge 15 after passing through the inside of the spheroidal depression 26. Namely, the chip is removed rearward after being bent and reduced in width so as to have a high rigidity. In this connection, such deformation is not attained by the projections against which the chip is pressed as in the related insert but can be attained by the concave edge portion 15b of the end cutting edge 15 itself and the successively disposed spheroidal depression 26.

Accordingly, the cutting resistance is small and deformation of the chip can be obtained irrespective of the longitudinal feed speed of the insert, thus making it possible to obtain a stable chip deforming effect. Namely, deformation of the chip is attained by the end cutting edge 15 when the chip is within the maximum temperature range, thus making it possible to reduce the resistance to deformation of the chip. Furthermore, since there is not any projection that causes deformation of the chip, the cutting resistance can be made smaller. Thus, in case of cutting off of a work in the form of bar, the central boss caused at the end face of the work can be made smaller. In case of cutting off of a work in the form of a pipe, the burrs at the inner circumferential periphery thereof can be made smaller.

Comparative examples were prepared which had a spheroidal depression constituting a portion of the same spheroid as the spheroidal depression 26 but were different in the maximum depth $D_a$ of the concave edge portion 15b of the end cutting edge 15, i.e. comparative examples were prepared so that maximum depths $D_a$ varied within the range from 0 to 0.3 mm. Comparative examples were used for cutting off of a work in the form of bar and compared with respect to the diameter and protrusion (height) of the center boss at the cut-off surface of the work. However, the radius of the concave edge portion 15b when observed in side elevation from the front end flank 17 side is about 1.5 mm and the width W of the end cutting edge 15 of the insert 1 is 1.8 mm. The cutting was performed at the spindle speed of 2000 rpm and at the feed of 0.03 mm/rev and under dry condition. The work was made of SUS 303 according to JIS and of the outer diameter of 12 mm. The result is shown in Table 1.

TABLE 1

| Sample No. | $D_a$ (mm) | $d_B$ (mm) | $h_B$ (mm) | Deformation Of Chip | Removal Of Chip | Life of Insert |
| --- | --- | --- | --- | --- | --- | --- |
| 1* | 0 | 0.5 | 1.0 | Not caused | Unstable | Long |
| 2 | 0.05 | 0.1 | 0.2 | Good | Stable | Long |
| 3 | 0.15 | 0.05 | 0.05 | Good | Stable | Long |
| 4 | 0.2 | 0.1 | 0.2 | Good | Stable | Long |
| 5 | 0.25 | 0.4 | 0.7 | Good | Unstable | Long |
| 6 | 0.30 | 0.7 | 1.2 | Good | Unstable | Short |

The mark * indicates that the sample is a comparative example.
$D_a$ is the maximum diameter of the concave edge portion.
$d_B$ is the diameter of a center boss formed at a cut-off surface of a work.
$h_B$ is the amount of protrusion (height) of the center boss.

The numerical values in the Table are averages resulting from 10 times of cutting off. In the meantime, a comparative example of an indexable insert (sample No. 1) does not have a concave edge portion and a spheroidal depression but an entirely straight end cutting edge, and is provided with a pair of projections adjacent the opposite ends of the end cutting edge.

As shown in Table 1, in cutting off by using the indexable insert 1 of this embodiment, the diameter $d_B$ and the amount $h_B$ of protrusion were almost smaller as compared with the comparative example (sample No. 1). This means that in case of cutting off by using the insert of this embodiment the insert was fed nearer to the center of the end surface of the work before the work was separated from the remainder, as compared with the comparative example. Further, it will be understood that the maximum depth of the concave edge portion, which is 0.05 mm, is sufficient for obtaining good deformation of chip. In cutting off by the comparative example, the life of the insert was long but deformation of the chip was not caused. This is considered due to the fact that the feed speed was too small. Further, the life of insert became short when the maximum depth of the concave edge portion was 0.3 mm. From the above, it is preferable to form a spheroidal depression in the rake face so that the maximum depth of the concave edge portion is within the range from 0.05 to 0.25 mm. Further, by setting the maximum depth of the concave edge portion at 0.2 mm or smaller, stable removal of the chip can be attained. This is considered due to the fact that the resistance to deformation of the chip becomes large when the maximum depth of the concave edge portion exceeds beyond 0.2 mm. From this, it is more preferable that the maximum depth of the concave edge portion is within the range from 0.05 to 0.2 mm.

Then, the chips of the sample Nos. 1 to 3 were used to cut off a work in the form of a pipe of 12 mm in outer diameter and 8 mm in inner diameter, and comparison was made as to the thickness of the burrs at the inner diameter of the cut-off surface of the work and the amount of protrusion of the same. The result is shown in Table 2.

As shown in Table 2, the burrs at the inner periphery in cutting off by the insert of this embodiment were smaller in thickness and the amount of protrusion as compared with those in cutting off by the insert of the comparative example. This is considered due to the fact that the resistance to cutting by the insert of this invention was smaller as compared with that by the insert of the comparative example.

TABLE 2

| Sample No. | Thickness of Burrs at Inner Periphery (mm) | Amount of Protrusion of Burrs (mm) |
| --- | --- | --- |
| 1* | 0.05 | 0.1 |
| 2 | 0.02 | 0.05 |
| 3 | 0.01 | 0.02 |

The mark * indicates that the sample is a comparative example.

Then, samples were prepared in which the maximum depth $D_a$ of the concave portion of the end cutting edge was constant, i.e., constantly 0.15 mm and the shape of the spheroid was varied so that the width $W_a$ of the spheroidal depression were varied within the range from 0.3 to 1.5 mm. By using the samples, the cutting off test of a work in the form of bar was made so as to examine the deformation of the chip and the life of the insert (strength of the insert at the opposite ends of the end cutting edge. However, the width W of the end cutting edge was constantly 1.8 mm. The result of the test was shown in Table 3.

As shown in Table 3, when the width $W_a$ of the concave edge portion is smaller than W/2 as the sample Nos. 1 and 2, deformation of the chip was small. When $W_a$ is larger than 2W/3 as sample No. 5, good deformation of the chip was obtained but the life of the insert was short. From this, it will be understood that the width W of the end cutting edge 15 and the width $W_a$ are preferably determined so as to satisfy $W/2 \leq W_a \leq 2W/3$.

TABLE 3

| Sample No. | $W_a$ (mm) | Deformation of Chip | Life of Insert |
| --- | --- | --- | --- |
| 1 | 0.3 | Hardly Caused | Long |
| 2 | 0.6 | Caused a little | Long |
| 3 | 0.9 | Good | Long |
| 4 | 1.2 | Good | Long |
| 5 | 1.5 | Good | Short |

$W_a$ is the width of the concave edge portion.

Figure 6:
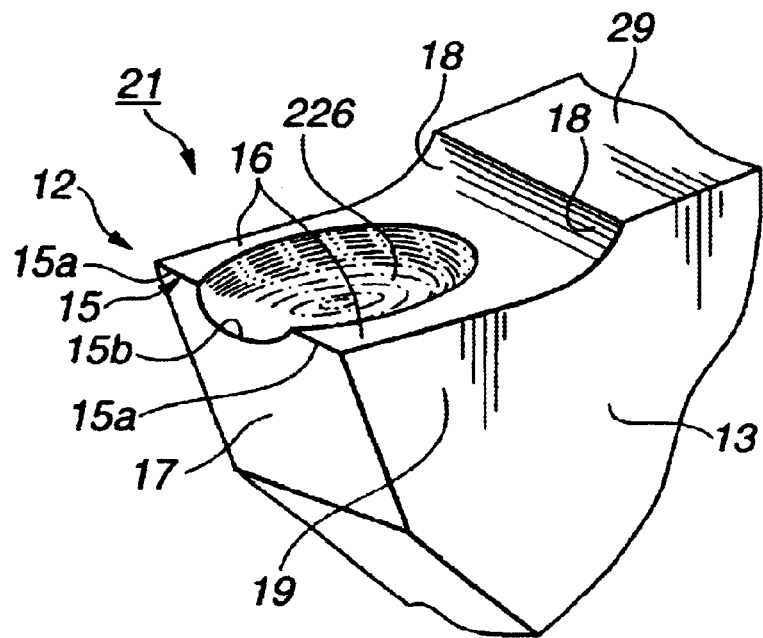
FIG. 6 is a perspective view of an important portion of an indexable insert according to a second embodiment of the present invention.
Figure 7:
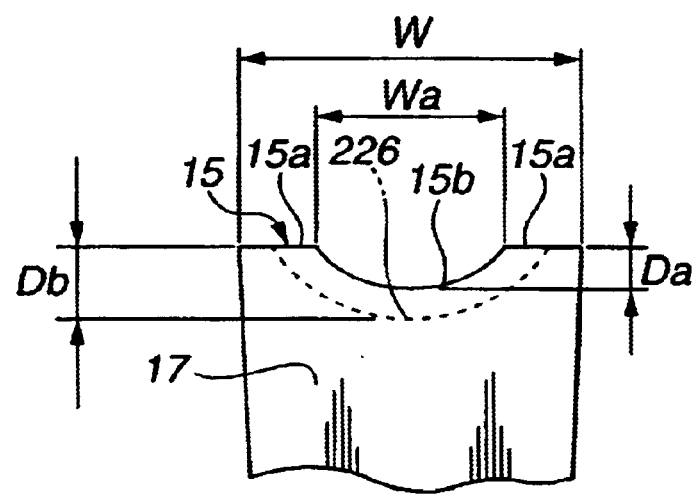
FIG. 7 is a side elevational view of the indexable insert of FIG. 6 when observed from a front end flank side.
Figure 8:
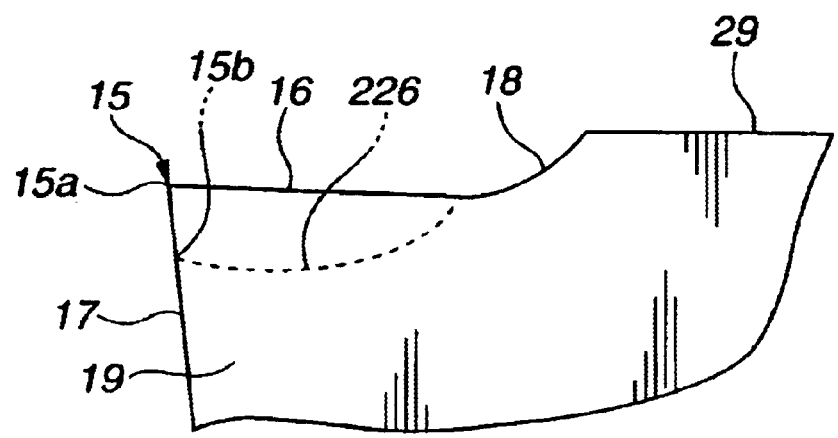
FIG. 8 is a side elevational view of the important portion of the indexable insert of FIG. 6 when observed from a side flank side.

Referring to FIGS. 6 to 8, an indexable insert 21 according to a second embodiment will be described. This embodiment differs from the first embodiment described with reference to FIGS. 1 to 5 in that a spherical depression 226 has a curved peripheral surface which constitutes a portion of a true sphere and is formed in the rake face 16 so as to provide the end cutting edge 15 with the concave edge portion 15b, and the spherical depression 226 is disposed forward of the breaker wall 18 so that the rear end of the spherical depression 226 is located at the rake face 16, i.e., the spherical depression 226 is formed so as not to cut in the hold-down surface 29 for clamping. Except for the above, this embodiment is substantially similar to the first embodiment. Thus, like portions to the first embodiment are designated by like reference characters and repeated description thereto is omitted. In the meantime, the chip produced in cutting off by using the insert 21 of this embodiment, though not shown, has a difficulty in flowing rearward since the distance from the concave edge portion 15b of the end cutting edge 15 to the rear end of the spherical depression 226 is shorter. Thus, the insert 21 is suited for cutting, the depth of cut of which is small. However, the cross sectional shape of the chip produced by the insert 21 takes after the shape of the concave edge portion 15b of the end cutting edge 15 similarly to the previous embodiment.

Figure 9:
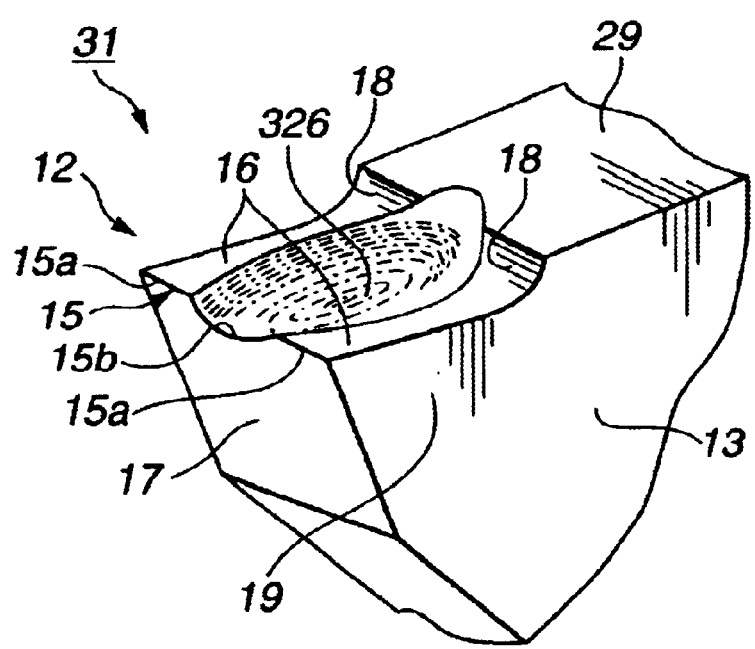
FIG. 9 is a perspective view of an important portion of an indexable insert according to a third embodiment of the present invention.
Figure 10:
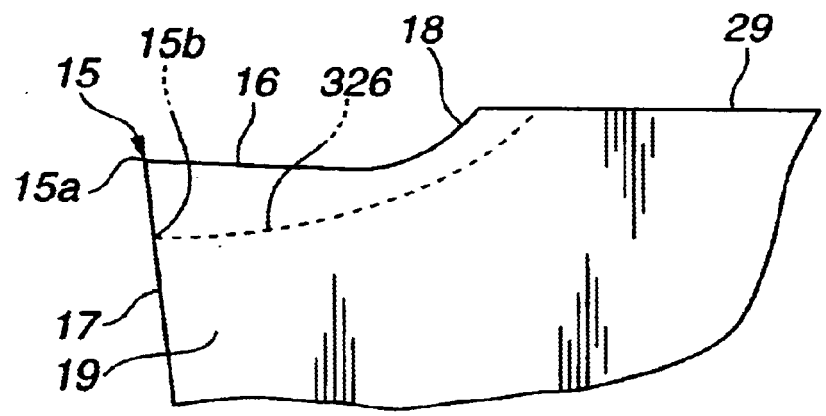
FIG. 10 is an enlarged side elevational view of the important portion of the indexable insert of FIG. 9 when observed from a side flank side.

Referring to FIGS. 9 and 10, an indexable insert 31 according to a third embodiment will be described. In the first embodiment described with reference to FIGS. 1 to 5, the maximum depth $D_b$ of the spheroidal depression 26 is larger than the maximum depth $D_a$ of the concave edge portion 15b of the end cutting edge 15. In contrast to this, in this embodiment, the spheroidal depression 326 formed in the rake face 16 becomes smaller in depth than the concave edge portion 15b as it extends increasingly rearward of the concave edge portion 15b. Except for the above, this embodiment is substantially similar to the first embodiment. Thus, similar portions are designated by like reference characters and repeated description thereto is omitted.

From the foregoing, it will be understood that in cutting off by the indexable insert of this invention the chip is removed after being bent widthwise and thereby formed into a concavely curved shape, i.e., after being deformed so as to have a high rigidity. Such deformation of chip is attained not by the projections disposed on the rake face at locations rearward of the end cutting edge as in the related insert but by the concave edge portion of the end cutting edge itself and the spherical depression extending continuously from the concave edge portion. Accordingly, the cutting resistance is small. Further, such deformation of the chip is attained irrespective of the longitudinal feed speed, the chip deforming effect produced by the insert can be stable. Further, the chip is deformed stably into a curled or coiled shape, it can be removed with efficiency and therefore it becomes possible to effectively protect the machined surface of the work from being marred or damaged, thus making it possible to improve the surface roughness of the work. Further, since the insert of this invention is not provided with projections for deformation of the chip, the resulting cutting resistance is small and therefore it becomes possible to make smaller the center boss or the inner periphery burrs formed at the cut-off face of the work at the time of its cutting off. Further, by the smaller cutting resistance, the wear of the cutting edge of the insert can be reduced and an elongation of the life of the insert in cutting off or grooving can be expected.

Figure 11:
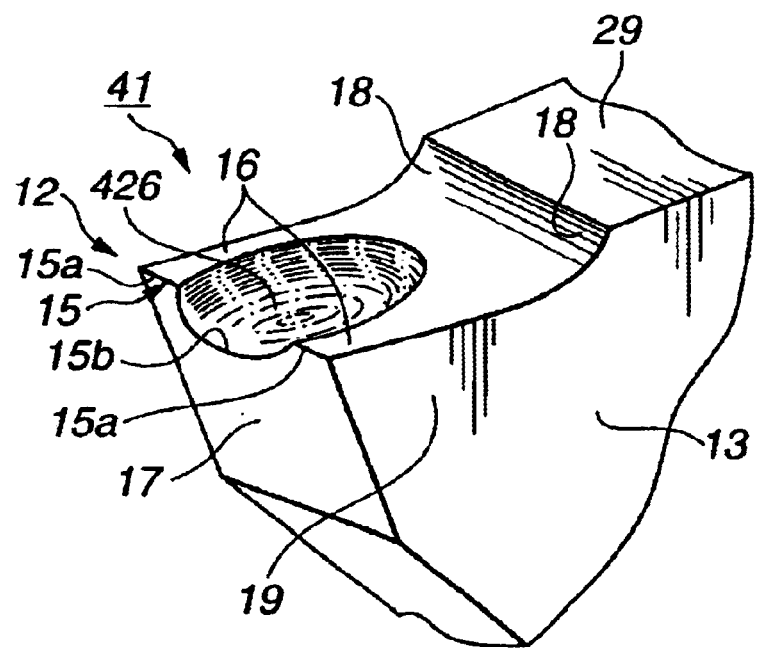
FIG. 11 is a perspective view of an important portion of an indexable insert according to a fourth embodiment of the present invention.
Figure 12:
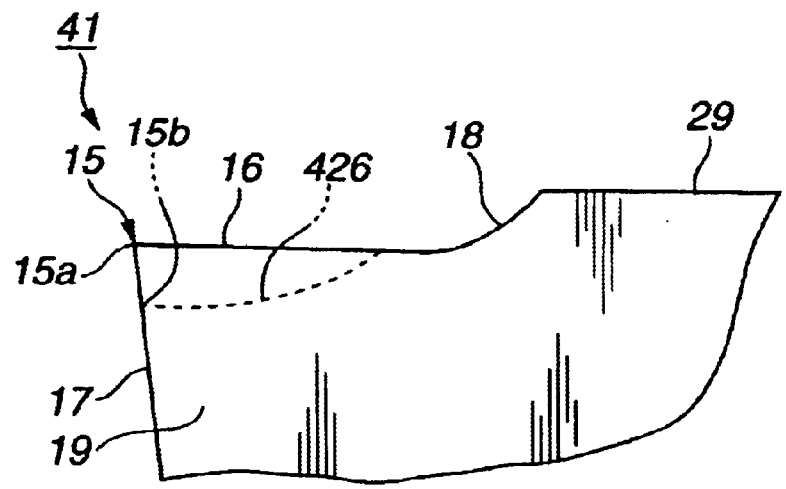
FIG. 12 is a side elevational view of the important portion of the indexable insert of FIG. 12 when observed from a side flank side.
Figure 13:
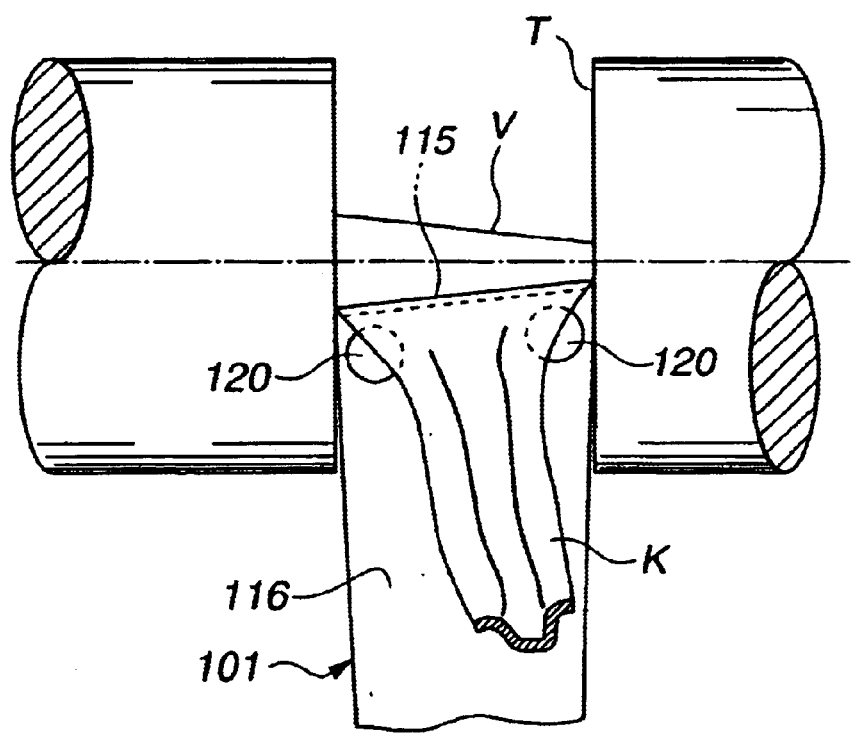
FIG. 13 is a plan view of an important portion of a related indexable insert for cutting off.

Although the invention has been described above by reference to certain embodiments of the invention, the invention is not limited to the embodiments described above. Modifications and variations of the embodiments described above will occur to those skilled in the art, in light of the above teachings. For example, the third embodiment wherein the rear end portion of the spheroidal depression 326 is formed so as to cut in the breaker wall 18 can be modified as in the insert 41 shown in FIGS. 11 and 12.

Namely, the rear end of the spheroidal depression 426 can be located at the rake face 16 so as not to extend over the breaker wall 18 even in the case the spheroidal depression 426 becomes smaller in depth than the concave edge portion 15*b* as it extend rearward of the concave edge portion 15*b*. Further, the spheroidal or spherical depression can be formed in the rake face irrespective of whether the breaker wall is provided or not. The depression can have a curved peripheral surface which constitutes a portion of a spheroid or a true sphere and can be designed variously depending upon the size of the rake face, the width of the end cutting edge, and the cutting conditions. Further, the indexable insert of the present invention is not limited to the two-corner type (i.e., the type having a pair of end cutting edges) but can be applied to various types such as three-corner type, i.e., a triangular, vertical type indexable insert having three cutting edges between adjacent two side surfaces. Further, the present invention is not limited to the indexable insert but can be applied to various cutting tools such as a solid tool. Further, the indexable insert of this invention can be used for grooving. The scope of the invention is defined with reference to the following claims.

What is claimed is:

1. A cutting tool comprising:

an end cutting edge at an end of a rake face; and a depression formed in the rake face so as to provide the cutting edge with a concave edge portion;

wherein the depression has a curved peripheral surface that is a portion of a spheroid;

wherein $D_a < D_b$ where $D_a$ is the maximum depth of the concave edge portion and $D_b$ is the maximum depth of the depression;

wherein $W_a < W_b$ where $W_a$ is the width of the concave edge portion of the end cutting edge and $W_b$ is the maximum width of the depression; wherein W is the width of the end cutting edge; and wherein $W/2 \leq W_a \leq 2W/3$.

2. An indexable insert comprising:

an end cutting edge at an end of a rake face;

the end cutting edge having a concave edge portion; and a spherical depression formed in the rake face so as to extend continuously from the concave edge portion of the end cutting edge;

wherein the spherical depression has a curved peripheral surface that is a portion of a spheroid;

wherein $D_a < D_b$ where $D_a$ is the maximum depth of the concave edge portion and $D_b$ is the maximum depth of the depression;

wherein $W_a < W_b$ where $W_a$ is the width of the concave edge portion of the end cutting edge and $W_b$ is the maximum width of the depression; wherein W is the width of the end cutting edge; and wherein $W/2 \leq W_a \leq 2W/3$.

* * * * *